3,385,822
MOISTURE CURABLE POLYSILOXANE PHOSPHATE COMPOSITION
Edgar D. Brown, Jr., Schenectady, N.Y., assignor to General Electric Company, a corporation of New York
No Drawing. Filed July 3, 1967, Ser. No. 650,591
5 Claims. (Cl. 260—46.5)

ABSTRACT OF THE DISCLOSURE

This invention relates to a polysiloxane composition which cures when exposed to atmospheric moisture. The compound has the unit formula:

$$(R)_a \left[ R_3Si(OSiR_2)_x - O - \underset{\underset{OR'}{|}}{\overset{\overset{O}{\|}}{P}} - O \right] (H)_c SiO_{\frac{4-(a+b+c)}{2}}$$

where R is an organic radical, and R' is a lower alkyl radical.

The composition is prepared by first reacting a polysiloxane of the formula:

$$R_3Si(OSiR_2)_xH$$

where $x$ has a value from 1 to 99, with an alkyl ester of phosphoric acid having the formula:

$$HO - \underset{\underset{OR'}{|}}{\overset{\overset{O}{\|}}{P}} - OH$$

The polysiloxanyl alkyl phosphoric acid diester formed, $$R_3Si(OSiR_2)_xO - \underset{\underset{OR'}{|}}{\overset{\overset{O}{\|}}{P}} - OH$$

is then reacted with a polysiloxane of the unit formula:

$$(R)_a(H)_{b+c}SiO_{\frac{4-(a+b+c)}{2}}$$

The curable reaction product produced can be used as an adhesive.

---

This invention relates to a stable, one-package polysiloxane composition which is stable for a prolonged period of time in a sealed container but curable upon exposure to atmospheric moisture to a flexible resilient polysiloxane and a method for making the same.

Previous one-package room temperature vulcanizable polysiloxane compositions have been based upon the presence of acid radicals on the polysiloxane chain which hydrolyze when exposed to moisture to cure the resin and liberate the free acid. It is an object of this invention to provide a new room temperature vulcanizable polysiloxane composition which obviates the necessity of using acid liberating compositions.

Another object is to provide a method of preparing room temperature vulcanizable polysiloxanes which liberate alcohol instead of acid when exposed to the atmosphere.

My invention has several advantages over the prior art moisture-curing compositions. In effecting a cure of the prior art moisture curable compositions, generally speaking, an acid is split off in a hydrolysis reaction. The acid which splits off, in many cases, does no harm and in many cases is an aid in producing surface effects on the base which aids in the bonding. On the other hand, the acid given off in the curing of many of the prior art polysiloxane compositions produces harmful effects in some particular uses. For example, some paint, fabric, plastic, paper, fiber and metal bases are sensitive to acids and may be damaged or discolored by the acids given off in an acid liberating cure system. In my cure system no free acid is liberated nor is any present in the curable composition.

The cure rates of my system are also much higher than the cure rates of the prior art acid liberating systems. This makes my adhesive more useful in coating and/or laminating operations where automatic machinery is used. For example, where a sheet is to be coated or laminated to a backing, machinery is presently available to perform the necessary mechanical functions at a rate of several hundred feet per minute. The cure time however, of acid liberating polysiloxane compositions is in the neighborhood of one hour and therefore makes the use of such adhesives in automatic laminating machinery impractical.

The cure rates of the compositions of the present invention can by proper selection of reactants be made very high. With cures being almost immediate, and no corrosive acid gases being given off which would destroy the machinery, my invention is well suited for many types of coating and laminating operations.

The room temperature curing silicone compositions of the present invention are also useful for casting and potting applications, caulking and sealing applications, in forming release coatings on paper, and on other cellulose base materials and in industrial applications, such as on buildings, factories, automotive equipment, and in applications where adhesion to masonry, glass, plastic, metal and wood is required.

The present invention is based on my discovery of improved temperature curable organopolysiloxanes which avoid all of the disadvantages heretofore mentioned of the prior art materials and which, in addition, permit the preparation of a wide variety of moisture curing, nonacid liberating polysiloxanes.

The moisture curable polysiloxane polymers of the present invention have the unit formula:

(1)
$$(R)_a \left[ R_3Si(OSiR_2)_x - O - \underset{\underset{OR'}{|}}{\overset{\overset{O}{\|}}{P}} - O \right]_b (H)_c SiO_{\frac{4-(a+b+c)}{2}}$$

where R' is a lower alkyl radical having 1 to 7 carbon atoms, R is selected from the group consisting of monovalent hydrocarbon radicals free of aliphatic unsaturation such as ethyl, propyl, isopropyl, butyl, octyl, etc.; cycloalkyl radicals, e.g., cyclopentyl, cyclohexyl, cycloheptyl, etc. radicals; aryl radicals, e.g., phenyl, naphthyl, tolyl, xylyl, etc. radicals; aralkyl radicals, e.g., benzyl, phenylethyl, phenylpropyl, etc. radicals; halogenated derivatives of the above radicals including chloromethyl, chloropropyl, trifluoromethyl, chlorophenyl, dibromophenyl, tetrachlorophenyl, difluorophenyl, etc. radicals, and cyanoalkyl radicals, e.g., beta-cyanoethyl, gamma-cyanopropyl, beta-cyanopropyl, etc., $a$ has a value of from 1.02 to 2.0, $b$ has a value of 0.02 to 0.5, $c$ has a value of 0.02 to .98, the sum of $b$ and $c$ is equal to 0.04 to 1.0, the sum of $a$ plus $b$ plus $c$ is equal to 2.02 to 2.5, and $x$ has a value of 1 to 99.

The compound of Formula 1 is a polysiloxane which is substituted along the chain by silanic hydrogen and radicals derived from the polysiloxanyl alkyl diester of phosphoric acid. It is the reaction between these groups which causes the composition to cure when exposed to moisture. There must be an average of at least one substituted polysiloxanyl alkyl phosphoric acid diester radical and at least one silanic hydrogen per molecule of the curable composition.

The room temperature vulcanizable polysiloxane of the present invention is prepared by the following series of reactions. R, R', $a$, $b$, $c$, and $x$ are defined as in Formula 1.

A monosilanic hydrogen polysiloxane (2) $\quad R_3Si(OSiR_2)_xH$ is reacted with a lower alkyl ester of phosphoric acid (3)

in the presence of a platinum compound catalyst to produce an alkyl polysiloxanyl diester of phosphoric acid (4)
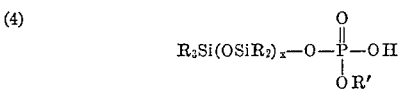

Hydrogen is liberated in the reaction described above, the molar ratio of the alkyl ester of phosphoric acid to the polysiloxane is 1:1 or more. Any excess of the alkyl ester which is unreacted at the end of the reaction is removed by distillation.

The alkylpolysiloxanyl diester of phosphoric acid of Formula 4 is in turn reacted with a polysiloxane having at least two silanic hydrogen groups per molecule of formula:

(5) $\quad (R)_a(H)_{b+c}SiO_{\frac{4-(a+b+c)}{2}}$ to produce the moisture curable polysiloxane polymer of Formula 1. This compound (1) cures rapidly upon exposure to atmospheric moisture. The reactions, except for the final cure, are all carried out in an inert atmosphere.

The reactants used in the above series of reactions may be selected from a wide range of compounds.

The polysiloxane having a single silanic hydrogen can vary from pentamethyldisiloxane to a polysiloxane having an average of 100 siloxane units. The polysiloxane of Formula 5 is a polysiloxane having an average of more than two silanic hydrogen substituents per molecule. This polysiloxane may vary from a tetrasiloxane fluid to a fluid having an average of 100 siloxane units per molecule.

The cure rate of the polysiloxane of Formula 6 can be increased by increasing the ratio of phosphorus to silicone and/or increasing the ratio of silanic hydrogen to silicon in the polysiloxane of Formula 6. The degree of cross-linking in the final product can be increased by increasing the phosphorus to silicon ratio or the silanic hydrogen to silicon ratio, whichever ratio is less. If they are equal, it will be necessary to raise both ratios.

The compositions of the present invention can be varied by the incorporation of various extenders or fillers. Illustrative of the many fillers which can be employed with the compositions of the present invention are titanium dioxide, lithopone, zinc oxide, zirconium silicate, silica aerogel, iron oxide, diatomaceous earth, calcium carbonate, fumed silica, precipitated silica, glass fibers, magnesium oxide, crushed quartz, calcined clay, asbestos, carbon, graphite, cork, cotton, synthetic fibers, etc. When fillers are added to the compositions of the present invention, they are generally employed in amounts from about 20 to 200 parts filler per hundred parts of the self-curing reaction product.

In addition to the modification of the compositions of the present invention by the addition of fillers, these compositions may also be modified by the incorporation of various flame retardants, stabilizing agents, and plasticizers, such as siloxane fluids. Suitable flame retardants include antimony oxide, various polychlorinated hydrocarbons and organic sulfonates.

When the compositions of the present invention contain components in addition to the moisture curable polysiloxane, it is often convenient to form a blend or mixture of the additional components, to then remove moisture from the resulting mixture by maintaining the mixture under vacuum and thereafter adding the moisture curing polysiloxane.

In order that those skilled in the art might readily understand how to practice the present invention, the following examples are presented. The catalyst used in the examples is prepared by dissolving chloroplatinic acid in 2-ethylhexyl alcohol in the ratio of 1 mole of chloroplatinic acid hexahydrate to 7 moles of 2-ethylhexyl alcohol. The pressure on the resulting reaction mixture is reduced to 25 millimeters and the reaction mixture is heated for 40 hours at 70° C., during which time hydrogen chloride and water are removed from the system. The pressure is then further reduced to 2 mm. Hg and the heating is continued until all unreacted alcohol has been removed. The reaction mixture is then allowed to cool at room temperature and is filtered. The filtrate is a viscous, pale brown liquid and comprises the catalyst of the present invention. This catalyst contains 21 percent by weight platinum and 8.3 percent by weight chlorine, which corresponds to about 2.1 atoms of chlorine per atom of platinum. The catalyst is dissolved in toluene to produce a solution containing 0.22 gram of platinum per liter of solution.

Example 1

To 77 grams (0.5 mole) of the monobutyl ester of phosphoric acid of the formula:

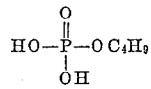

in a sealed three-necked flask is added 0.10 ml. of the catalyst solution described above. The flask is heated and when the temperature of the solution reaches 85° C., 40 grams of pentamethyldisiloxane of the formula:

$(CH_3)_3SiOSi(CH_3)_2H$ are added in one or two gram aliquots. Then, 0.05 ml. of the catalyst solution is added to the reaction mixture. An additional 19 grams of the pentamethyldisiloxane is then added in one or two gram aliquots. After hydrogen is no longer evolved the pressure on the resulting reaction mixture is reduced to 25 mm. Hg the temperature is maintained at 85° C. and the excess monobutyl ester of phosphoric acid is removed by distillation. Four grams of fuller's earth are added to the product and the mixture is stirred for five minutes. The slurry is filtered through a bed of diatomaceous earth to product a tea-colored fluid. The product is butyl pentamethyldisiloxanyl diester of phosphoric acid having the formula:

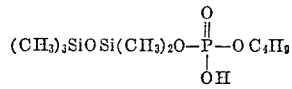

Sixty grams of trimethylsilyl end-stopped methyl hydrogen polysiloxane of the formula:

$(CH_3)_3SiO[Si(H)(CH_3)O]_{24}Si(CH_3)_3$ are heated to 80° C. with 0.05 ml. of the catalyst solution. To the heated mixture in ½ gram aliquots are added 29.6 grams of the butyl disiloxanyl diester of phosphoric acid. The reaction mixture is kept isolated from moisture at all times. The reaction is exothermic for the first half of the addition and the temperature of the reaction mixture rises to 96° C. During the addition of the second half of the mixture it is necessary to add heat to maintain an 80° C. temperature of the reaction mixture. Copious quantities of hydrogen are evolved.

An infrared analysis at the end of the reaction shows that the hydrogen content of the methyl hydrogen polysiloxane has been reduced on the order of 12% and that all of the free acid radicals are gone. The P=O peak is still clearly visible. The product is a methyl hydrogen polysiloxane fluid which has approximately 12% of the hydrogen substituents replaced by radicals derived from the butyl disiloxanyl diester of phosphoric acid. The curable polysiloxane produced has the unit formula:

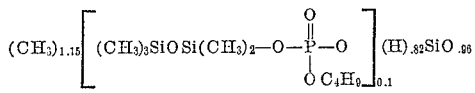

When the reaction product is exposed to the atmosphere, cure is almost immediate. A rubbery material is formed and butyl alcohol vapors and hydrogen are given off.

When a solution of the reaction product in methylene chloride is used to coat paper, cure immediately follows the removal of the solvent. This is shown by the fact that an adhesive strip is easily removed from the coated surface as soon as the solvent is evaporated.

Example 2

To 70 grams (0.5 mole) of the propyl ester of phosphoric acid of the formula:

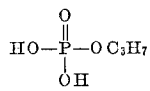

in a sealed three-necked flask is added 0.10 ml. of the catalyst solution. The flask is heated and when the temperature of the solution reaches 85° C., 75 grams of heptamethyltrisiloxane of the formula:

$(CH_3)_3SiOSi(CH_3)_2OSi(CH_3)_2H$ are added in one or two gram aliquots. Then, 0.05 ml. of the catalyst solution is added to the reaction mixture and an additional 36 grams of the heptamethyl hydrogen trisiloxane are added in one or two gram aliquots. Four grams of fuller's earth are added to the product and the mixture is stirred for five minutes. The slurry is filtered through a bed of diatomaceous earth to produce a tea-colored fluid. The product is the propyl heptamethyltrisiloxane diester of phosphoric acid and has the formula:

Sixty grams of trimethyl end-blocked methyl hydrogen polysiloxane of the average formula:

$(CH_3)_3SiO[Si(H)(CH_3)O]_{51}Si(CH_3)_3$ are heated to 80° C. with 0.05 ml. of the catalyst solution. To the heated mixture, 36 grams of the propyl heptamethyltrisiloxane diester of phosphoric acid are added in ½ gram aliquots. The reaction mixture is kept isolated from moisture at all times. The temperature is maintained at 80° C. during the addition except for a short period at the beginning of the addition when there is a mild rise in temperature. Copious quantities of hydrogen are evolved.

An infrared analysis at the end of the reaction shows that the hydrogen content of the methyl hydrogen, polysiloxane has been reduced on the order of 10% and that all of the free acid radicals are gone. The P=O peak is still clearly visible. The product is a methylhydrogen fluid which has 10% of the silanic hydrogen replaced by radicals derived from the propyl trisiloxanyl diester of phosphoric acid, and has the unit formula:

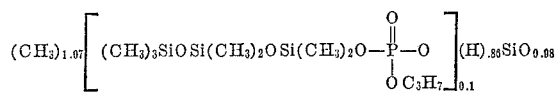

When the reaction product is exposed to atmospheric moisture, a rubbery material is formed almost immediately and hydrogen and propyl alcohol vapors are given off.

While the foregoing examples and descriptions have illustrated a number of embodiments of my invention, it is understood that the present invention relates to a broad class of room temperature curing silicone rubber compositions which are characterized by curing to the solid elastic state at room temperature upon exposure to normal atmospheric moisture without the formation of free acid and are further characterized by an extended shelf life in a sealed container.

What I claim as new and desire to secure by Letters Patent of the United States is:

1. A composition stable under anhydrous conditions and curable to the solid, elastic state upon exposure to atmospheric moisture comprising an organopolysiloxane having the average unit formula:

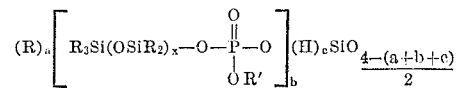

where R' is a lower alkyl radical having 1 to 7 carbon atoms, R is a member selected from the class of compounds free of aliphatic unsaturation consisting of monovalent hydrocarbon radicals, halogenated monovalent hydrocarbon radicals and cyanoalkyl radicals, $a$ has a value of 1.02 to 2.0; $b$ has a value of 0.02 to 0.5; $c$ has a value of 0.02 to 0.98; the sum of $b$ and $c$ has a value of 0.04 to 1.0; the sum of $a$ plus $b$ plus $c$ is equal to 2.02 to 2.5; and $x$ has a value of 1 to 99.

2. The composition of claim 1 where R' is selected from the group consisting of methyl, ethyl, propyl and butyl.

3. The composition of claim 1 where R is methyl.

4. The composition of claim 1 where R is methyl and R' is butyl.

5. The composition of claim 1 where R' is butyl.

References Cited

UNITED STATES PATENTS 3,113,139   12/1963   Birum et al. _____ 260—465

DONALD E. CZAJA, *Primary Examiner.*

M. I. MARQUIS, *Assistant Examiner.*